United States Patent
Baracchi et al.

(10) Patent No.: US 6,716,349 B2
(45) Date of Patent: Apr. 6, 2004

(54) FILTER FOR DIESEL ENGINE FUEL (75) Inventors: Paolo Baracchi, Turin (IT); Claudio Crovetti, Mantova (IT); Sergio Tallano, Porto Mantovano (IT)

(73) Assignee: Sogefi Filtration S.p.A., Mantova (IL)

( * ) Notice: Subject to any disclaimer, the term of this patent is extended or adjusted under 35 U.S.C. 154(b) by 0 days.

(21) Appl. No.: 09/979,130

(22) PCT Filed: Mar. 16, 2001

(86) PCT No.: PCT/EP01/03052
§ 371 (c)(1),
(2), (4) Date: Nov. 19, 2001

(87) PCT Pub. No.: WO01/72396
PCT Pub. Date: Oct. 4, 2001

(65) Prior Publication Data
US 2002/0157999 A1 Oct. 31, 2002

(30) Foreign Application Priority Data
Mar. 24, 2000 (IT) ........................... MI2000A0633

(51) Int. Cl.⁷ ............... B01D 27/14; B01D 17/02; B01D 17/04; B01D 29/15; B01D 36/02
(52) U.S. Cl. .............. 210/299; 210/799; 210/315; 210/489; 210/492; 210/DIG. 5
(58) Field of Search .................. 210/799, 489, 210/492, 315, 299, DIG. 5

(56) References Cited

U.S. PATENT DOCUMENTS

| | | | | |
|---|---|---|---|---|
| 2,953,249 A | * | 9/1960 | Topol et al. | |
| 3,228,527 A | * | 1/1966 | McPherson | |
| 4,081,373 A | * | 3/1978 | Rozniecki | 210/114 |
| 4,233,042 A | | 11/1980 | Tao | |
| 4,372,847 A | | 2/1983 | Lewis | |
| 4,477,345 A | | 10/1984 | Szlaga, Jr. | |
| 4,502,955 A | | 3/1985 | Schaupp | |
| 4,740,299 A | | 4/1988 | Church et al. | |
| 4,995,974 A | * | 2/1991 | Lorey et al. | |
| 5,800,584 A | | 9/1998 | Lothar et al. | |
| 5,904,956 A | * | 5/1999 | Kheyfets | 427/244 |

FOREIGN PATENT DOCUMENTS

| | | |
|---|---|---|
| DE | A-34 40 506 | 5/1986 |
| GB | A-950 333 | 2/1964 |
| GB | 2020564 | * 11/1979 |
| WO | A-93 01874 | 2/1993 |
| WO | A-98 52676 | 11/1998 |

* cited by examiner

Primary Examiner—Thomas M. Lithgow
(74) Attorney, Agent, or Firm—Guido Modiano; Albert Josif; Daniel O'Byrne (57) ABSTRACT

A filter for Diesel engine fuel, comprising a filtering mass which is contained within an enclosure and is provided so as to be crossed by the fuel in its path inside the filter between an intake connector and a discharge connector. The enclosure comprises a water collection chamber at its bottom. The filter further comprises at least two micromeshes which are adapted to be crossed sequentially by the fuel that exits from the filtering mass.

17 Claims, 7 Drawing Sheets

FILTER FOR DIESEL ENGINE FUEL

TECHNICAL FIELD

The present invention relates to a filter for Diesel engine fuel.

BACKGROUND ART

It is known that filters inserted in the supply circuit of Diesel engine fuel, commonly known as Diesel fuel, comprise means adapted to separate the water contained in the fuel, but these means are less than fully satisfactory.

A very common type of filter utilizes the phenomenon of coalescence, according to which the microscopic water droplets that pass through the filtering mass mixed in with the Diesel fuel tend to merge along the path leading to the peripheral region of the fibers of said filtering mass, forming drops of a certain size which appear on the surface on which the Diesel fuel exits from said mass.

Some of these drops slide downward along said surface by gravity and collect in a chamber provided at the bottom of the filter, forming a mass of water which is periodically evacuated, but many of the drops escape from the surface, entrained by the Diesel fuel in its motion, and thus remain included therein, causing a loss of effectiveness of the filter.

DISCLOSURE OF THE INVENTION

The aim of the present invention is to provide a filter for Diesel engine fuel which ensures high efficiency in eliminating water from the fuel.

This aim is achieved by a filter for Diesel engine fuel, according to the invention, comprising a filtering mass which is contained within an enclosure, said mass being designed to be crossed by the fuel in its path inside the filter between an intake connector and a discharge connector, said enclosure comprising a water collection chamber at the bottom, characterized in that it comprises at least two micromeshes which are adapted to be crossed sequentially by the fuel that exits from the filtering mass.

BRIEF DESCRIPTION OF THE DRAWINGS

Further characteristics and advantages of the present invention will become better apparent from the following detailed description of some preferred but not exclusive embodiments thereof, illustrated only by way of non-limitative example in the accompanying drawings, wherein.

WAYS OF CARRYING OUT THE INVENTION

Figure 1:
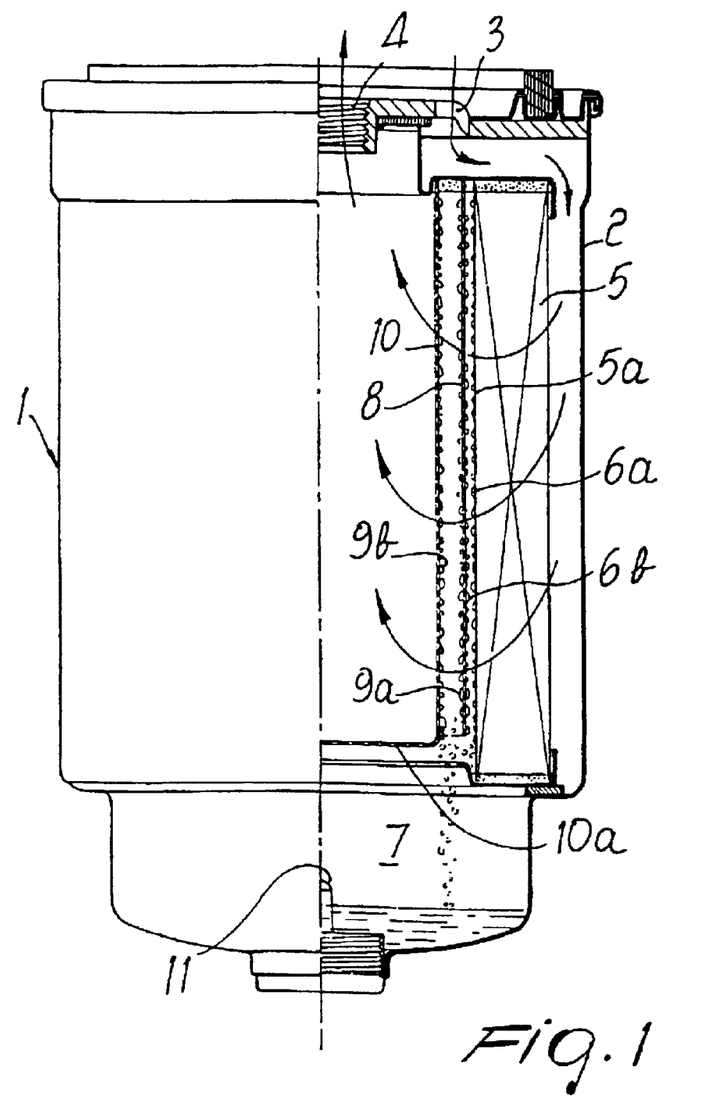
FIG. 1 is a partial sectional view, taken along a longitudinal plane, of the invention according to a first embodiment.

With reference to FIG. 1, reference numeral 1 generally designates a filter comprising a per se known structure which is adapted to determine, inside the enclosure 2, the circulation of the Diesel fuel indicated by the arrows in the figure between the intake connector 3 located at the enclosure and the discharge connector 4 located in the central region, passing through the filtering mass 5.

The water droplets that have formed by coalescence during the flow of the Diesel fuel through said filtering mass emerge from the surface 5a of said filtering mass, and while some of the droplets, such as 6a, slide by gravity along the surface 5a to collect in the collection chamber 7 provided at the bottom of the enclosure 2, the remaining droplets continue along their path, included within the Diesel fuel, and encounter the first micromesh 8 located proximate to the surface 5a.

Some droplets, such as 6b, are retained at the intake of the mesh, while others, such as 9a, form at the discharge of said mesh: all the droplets in any case slide toward the collection chamber 7.

The Diesel fuel continues in its motion, and any water droplets that might still be present, such as 9b, are captured by the second micromesh 10 and separate from the Diesel fuel, descending into the chamber 7.

The above operating methods have been described merely as an indication, since operation is greatly influenced by the functional parameters of the motor supplied with the treated Diesel fuel and by the dimensions of the micromeshes.

At the output of the micromesh 10, the purified Diesel fuel is sent to the engine, while the water collected in the chamber 7 is emptied periodically when indicated by the sensor 11.

The micromesh 10 has a complete bottom 10a, also made of micromesh, but said bottom might be only partial and provided with a blind surface, and might also be omitted.

Figure 2:
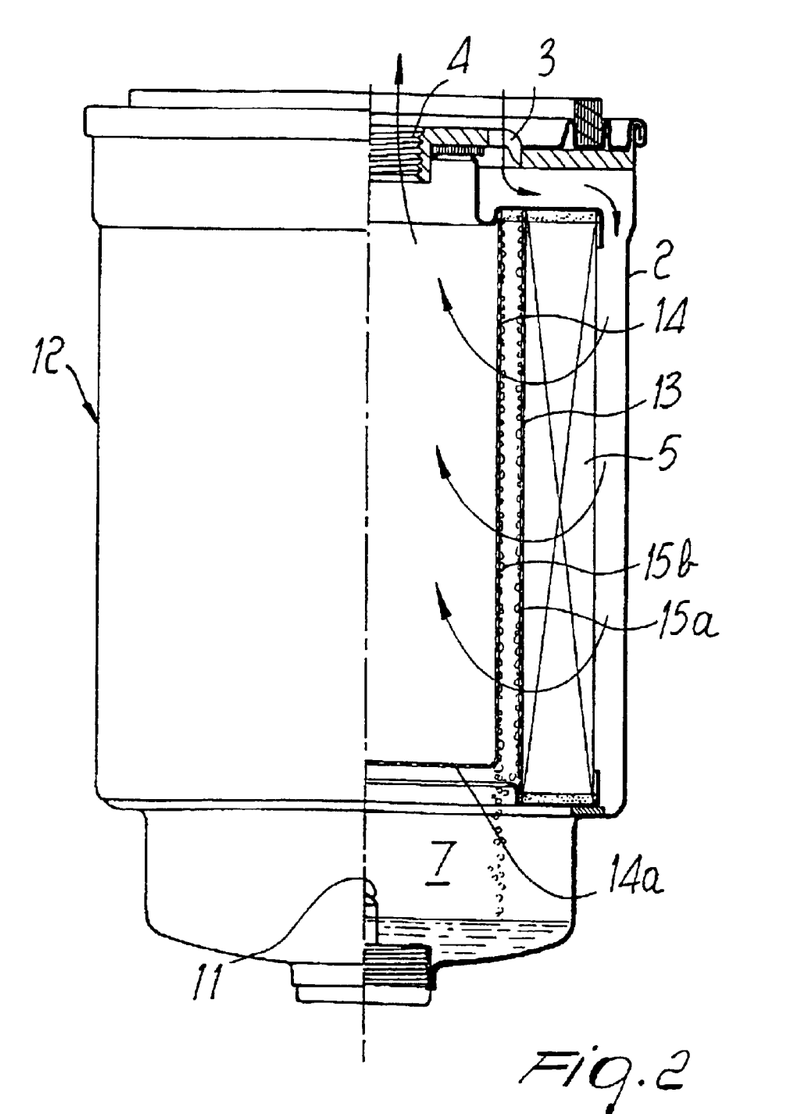
FIG. 2 is a view of a second embodiment of the invention.

FIG. 2 illustrates a filter 12 having the structure as described above and in which the first micromesh 13 is arranged so as to adhere to the filtering mass 5, while the second micromesh 14 is located proximate to the first micromesh 13.

Some of the water droplets such as 15a that form by coalescence during the flow of the fuel through the filtering mass 5 are captured immediately by the first micromesh 13 and slide downward along it, collecting in the collection chamber 7.

As the Diesel fuel continues in its motion, it encounters the second micromesh 14, and the water droplets being still present therein, such as 15b, are captured and slide toward the chamber 7.

The micromesh 14 has a complete bottom 14a, also made of micromesh, but said bottom might be only partial and provided with a blind surface, and might also be omitted.

Figure 3:
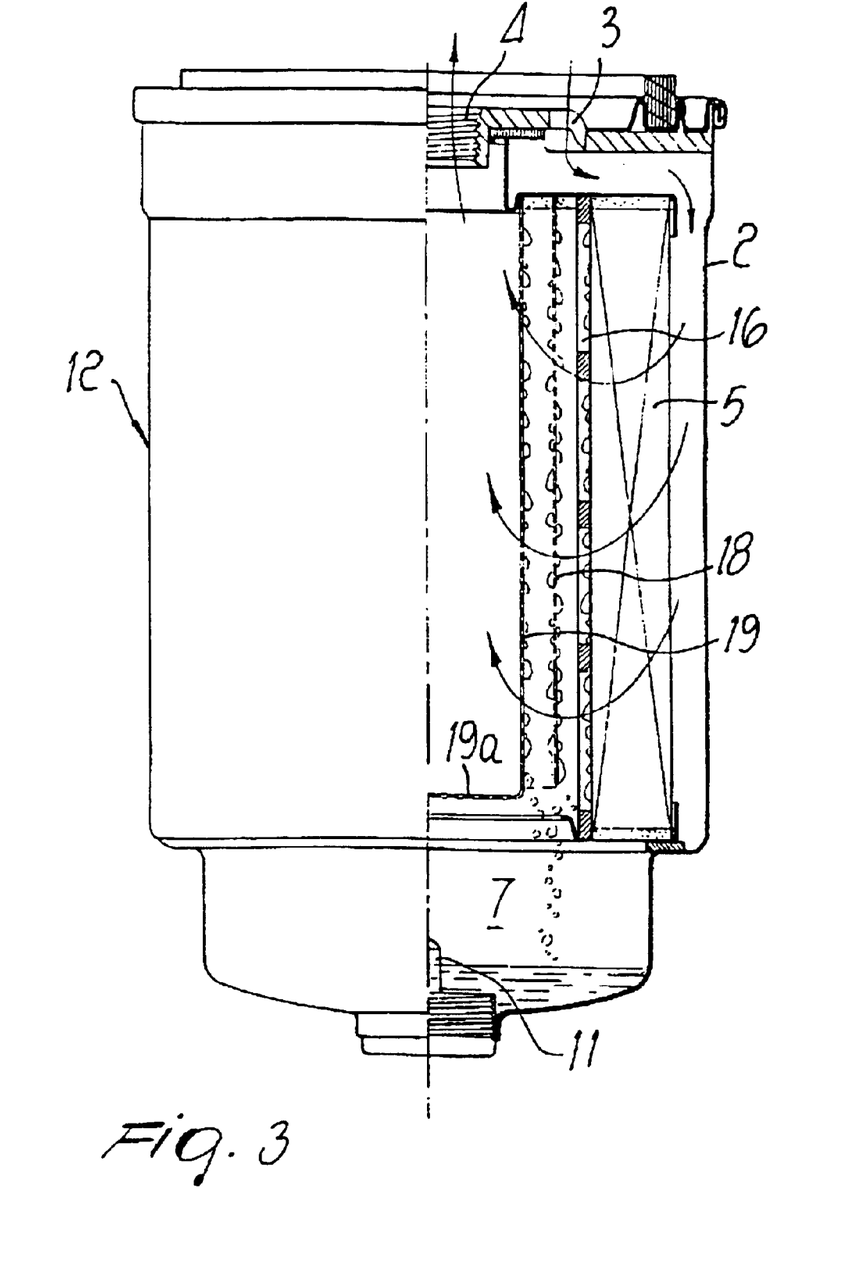
FIGS. 3, 4 and 5 are views of three variations of the invention, comprising a sleeve for reinforcing the filtering mass.
Figure 4:
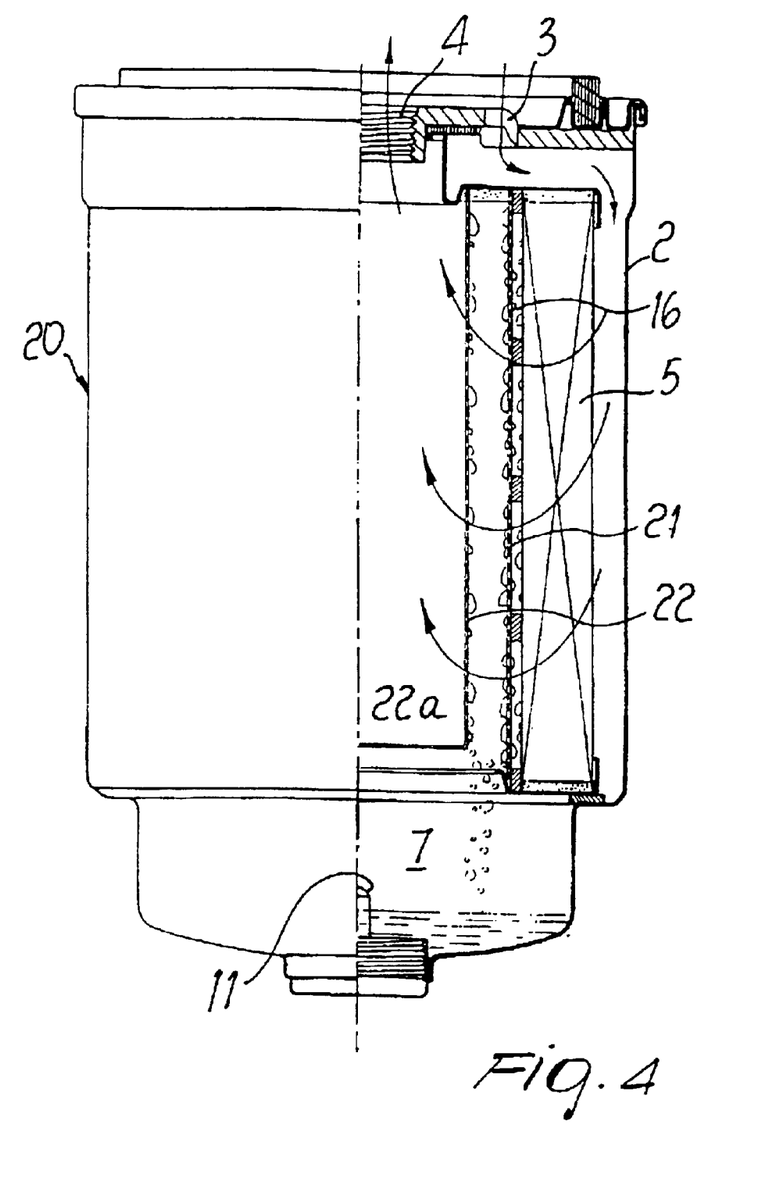
Figure 5:
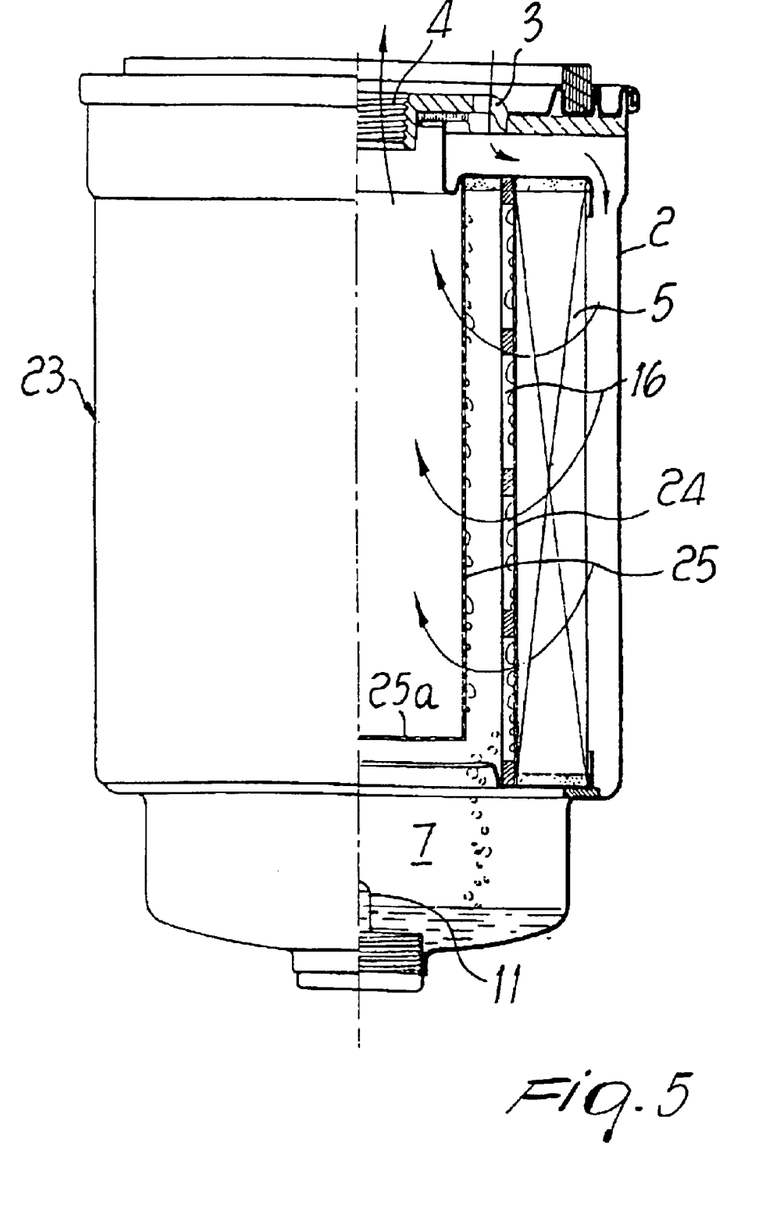

The filters shown in FIGS. 3, 4 and 5 also have a structure as described above, but they also comprise in a known manner the sleeve 16 for reinforcing the filtering mass 5 which is adjacent to the internal surface of said mass.

According to the invention, the filter 17 shown in FIG. 3 has the first micromesh 18 proximate to the sleeve 16 and the second micromesh 19 proximate to the first micromesh 18; the filter 20 shown in FIG. 4 has the first micromesh 21 in contact with the sleeve 16 and the second micromesh 22 proximate to the first micromesh 21; and the filter 23 shown in FIG. 5 has the first micromesh 24 interposed between the sleeve 16 and the filtering mass 5 and the second micromesh 25 proximate to the sleeve 16.

The description given regarding the bottoms 10a and 14a of the micromeshes 10 and 14 provided in the embodiments of the invention considered with reference to FIGS. 1 and 2, respectively, also applies to the bottom of the micromeshes 19, 22 and 25, designated by the reference numerals 19a, 22a, 25a respectively.

Upon the above description, the functional characteristics of these filters are obvious and are in any case highlighted by the illustration of the water droplets shown in the respective figures; accordingly, an analytical description of said figures is deemed unnecessary.

Figure 6:
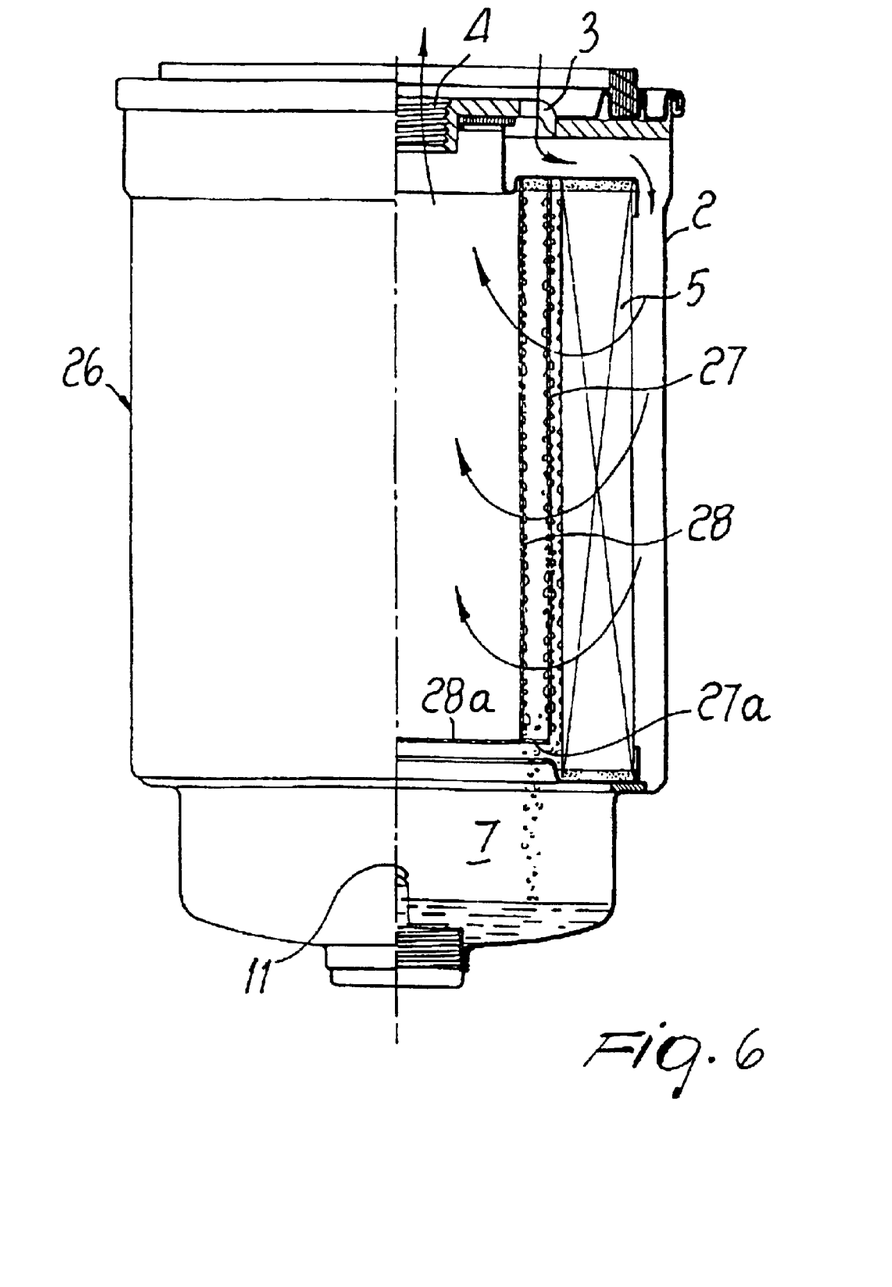
FIGS. 6 and 7 are views of two further embodiments of the invention.

The filter 26 shown in FIG. 6 has a structure as described above; in said filter, the first micromesh 27 comprises, at its lower end, the perforated bottom 27a, which is connected to the second micromesh 28; variations are also possible in which said bottom 27a is extended so as to connect to the filtering mass 5 or the bottom 28a of the second micromesh has the variety of shapes mentioned earlier; the first micromesh might have a bottom such as 27a even if it is located so as to adhere to the filtering mass 5.

Figure 7:
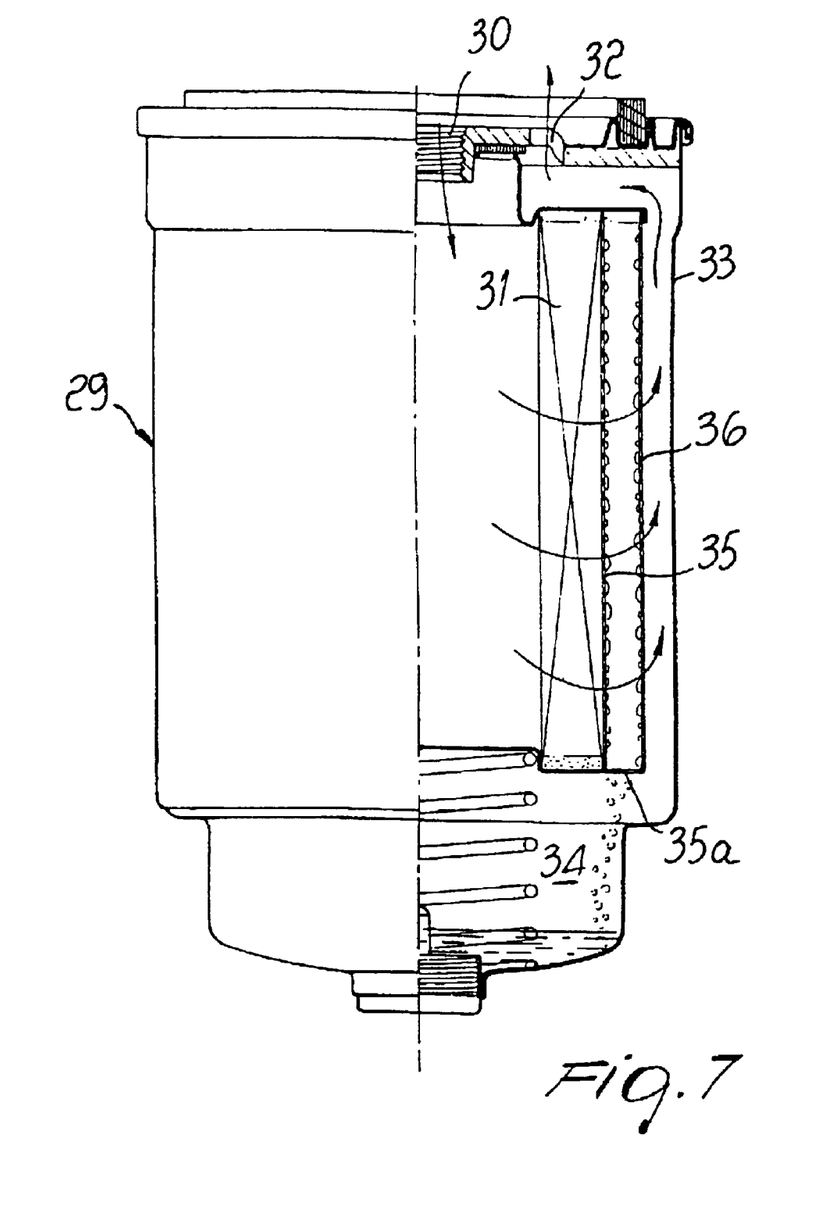

In the filter 29 of FIG. 7, the fuel intake is provided by way of the connector 30 located centrally, and after passing through the filtering mass 31 along the arrows shown in the figure, the fuel exits from the filter by way of the connector 32 at the outer enclosure 33, which is provided, proximate to the bottom, with the water collection chamber 34.

In this case, the two micromeshes 35 and 36, connected by the perforated bottom 35a, are arranged outside the filtering mass 31; the bottom 35a might also be omitted and the first micromesh 35 might of course be arranged proximate to said filtering mass 31 instead of adhering thereto.

The described invention is susceptible of numerous other modifications and variations, all of which are within the scope of the appended claims; thus, for example, the ends of the micromeshes can be associated in any manner with the structure of the filter and be fixed thereto or not, and if the micromesh adheres to the supporting sleeve it can be provided monolithically therewith; the two micromeshes may further be joined in a monolithic unit.

Additional micromeshes, in addition to the two described ones, may also be provided.

The disclosures in Italian Patent Application No. MI20000A000633 from which this application claims priority are incorporated herein by reference.

What is claimed is:

1. A filter for Diesel engine fuel, comprising: an enclosure; a filtering mass contained within the enclosure; an intake connector; a discharge connector; said mass being provided so as to be crossed by, the fuel following a path inside the filter between the intake connector and the discharge connector and to form to an emergence surface thereof coalesced water droplets, said enclosure comprising a bottom water collection chamber; and at least to micromeshes which we arranged so as to be crossed sequentially by the fuel that exits from the filtering mass, a first one of said micromeshes being provided so as to retain at an intake surface thereof the coalescence droplets formed at said mass and to form at a discharge surface thereof further coalescence droplets, a second one of said micromeshes being dimensioned so as to capture said further coalescence droplets.

2. The filter according to claim 1, wherein said micromeshes comprise a first micromesh, which is arranged so as to be crossed by the fuel that exits from the filtering mass and is located proximate to a surface of said mass, and a second micromesh, which is arranged so as to be crossed by the fuel that exits from the first micromesh and is located proximate to said first micromesh.

3. The filter according to claim 1, wherein said micromeshes comprise a first micromesh, which is arranged so as to be crossed by the fuel that exits film the filtering mass adheres to said mass, and a second micromesh, which is arranged so as to be crossed by the fuel that exits micromesh and is located proximate to said first micromesh.

4. The filter according to claim 1, wherein the fuel intake connector is located proximate to the enclosure and the discharge connector is located at a central top region of said enclosure, and a second one of said micromeshes is located inside the filtering mass and is at least partially provided with a bottom region.

5. The filter according to claim 4, wherein the bottom region of said second micromesh is made of micromesh.

6. The filter according to claim 4, wherein the bottom region of said second micromesh is provided with a blind surface.

7. The filter according to claim 1, wherein the fuel intake connector is located proximate to the enclosure, and the discharge connector is located at a central top region of said enclosure, and a second one of said micromeshes is located inside the filtering mass and is bottomless.

8. The filter according to claim 1, comprising a reinforcement sleeve which is adjacent to an internal surface of the filtering mass, a first one of said micromeshes being located proximate to said sleeve.

9. The filter according to claim 1, comprising a reinforcement sleeve which is adjacent to an internal surface of the filtering mass, a first one of said micromeshes being arranged so as to adhere to said sleeve on an inner part of said sleeve.

10. The filter according to claim 1, comprising a reinforcement sleeve which is adjacent to an internal surface of the filtering mass, a first one of said micromeshes being interposed between the sleeve and the filtering mass.

11. The filter according to claim 1, wherein at first one of said micromeshes is provided, at a rower end thereof, with a perforated bottom for connection to a second one of said micromeshes.

12. The filter according to claim 1, said micromeshes comprise a first micromesh located proximate to the filtering mass, which has, at a lower end thereof a perforated bottom for connection to said filtering mass.

13. The filter according to claim 1, comprising a first and a second micromeshes, said first and second micromeshes being joinable in a monolithic unit.

14. A filter for Diesel engine fuel, comprising: an enclosure; a filtering mass contained within the enclosure and having an emergence surface; an intake connector; a discharge connector; said mass being provided so as to be crossed for the fuel following a path inside the filter between the intake connector and the discharge connector and to form to the emergence surface thereof coalesced water droplets, said enclosure comprising a bottom water collection chamber and at least two micromeshes which we arranged so as to be crossed sequentially by the fuel that exits from the filtering mass and passes across respective intake and discharge surfaces of the micromeshes, with a first one of said micromeshes being provided so as to retain at the intake surface thereof the coalescence droplets formed at said mass and to form further coalescence droplets at a discharge surface thereof and with a second one of said micromeshes that has a complete bottom and is dimensioned so as to capture said further coalescence droplets.

15. the filter for Diesel engine fuel of claim 14, wherein said complete bottom of said second one of the micromeshes is made of micromesh.

16. A filter for Diesel engine fuel, comprising: an enclosure; a filtering mass contained within the and having an emergence surface; an intake connector; a discharge connector; said mass being provided so as to be crossed by the fuel following a path inside the filter between the intake connector and the discharge connector and to form to the emergence surface thereof coalesced water droplets, said enclosure comprising a bottom water collection chamber; and at least two micromeshes which are arranged so as to be crossed sequentially by the fuel that exits from the filtering mass and passes across respective intake and discharge surfaces of the micromeshes, with a first one of said micromeshes being provided so as to retain at the intake surface thereof the coalescence droplets formed at said mass and to form further coalescence droplets at a discharge surface thereof and with a second one of said micromeshes that has a complete bottom made of micromesh and is dimensioned so as to capture said further coalescence droplets.

17. The filter for Diesel engine fuel of claim 16, wherein said discharge connector is located in a central upper region of said enclosure.

* * * * *